July 31, 1951 C. E. SCHLYTERN 2,562,823
ELECTRICAL POWER DRIVEN OPERATOR UNIT
Original Filed March 21, 1947 2 Sheets-Sheet 1
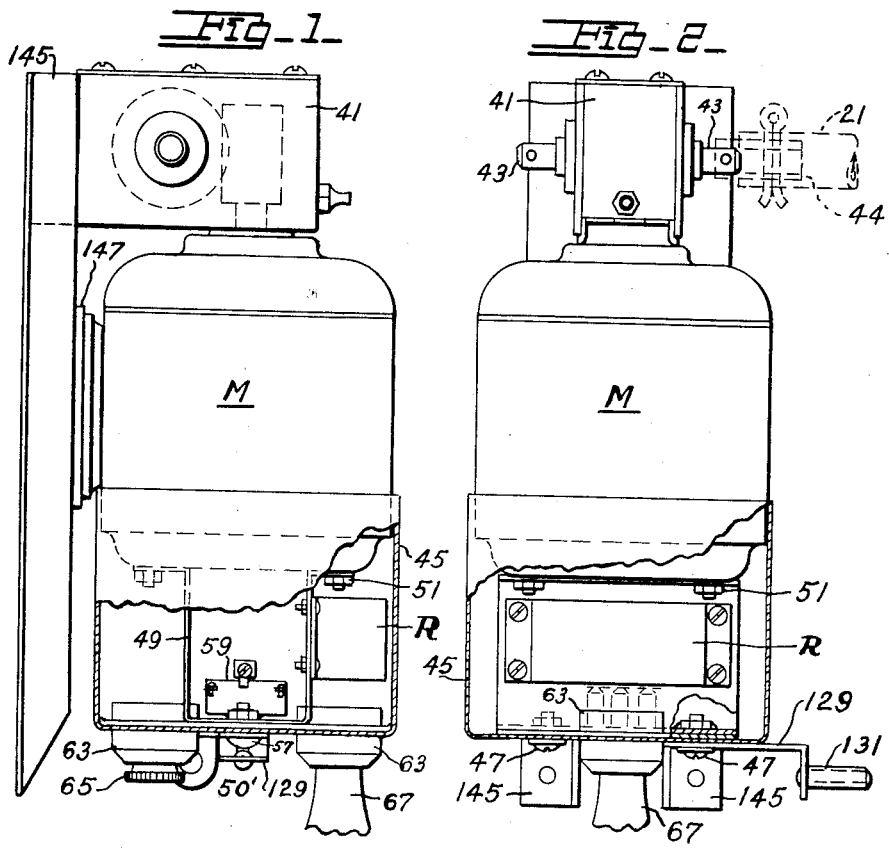
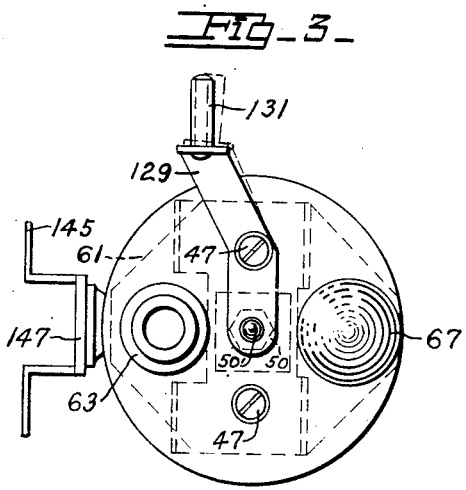
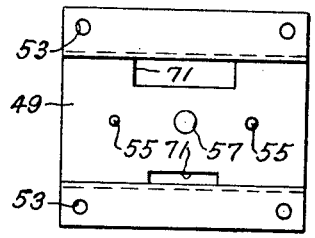
INVENTOR.
CHARLES E. SCHLYTERN
BY F.D.Hicks
His Attorney July 31, 1951     C. E. SCHLYTERN     2,562,823
ELECTRICAL POWER DRIVEN OPERATOR UNIT
Original Filed March 21, 1947     2 Sheets-Sheet 2
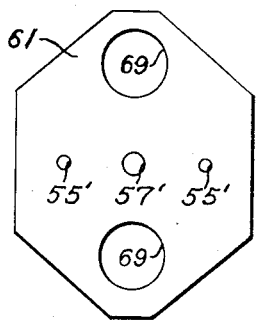
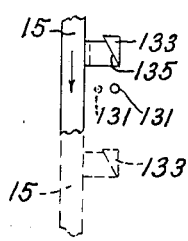
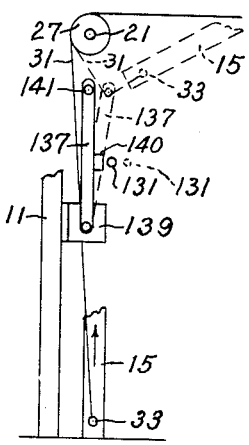
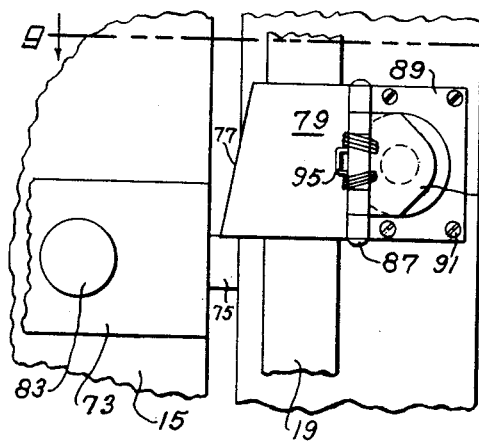
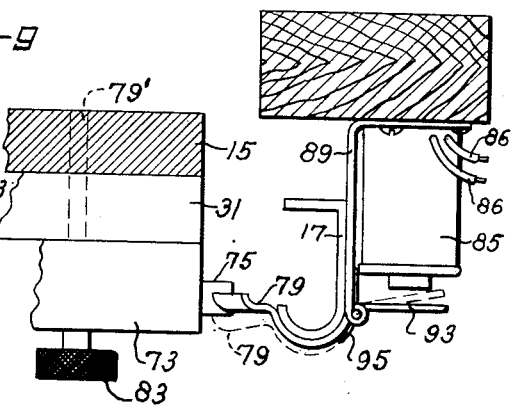
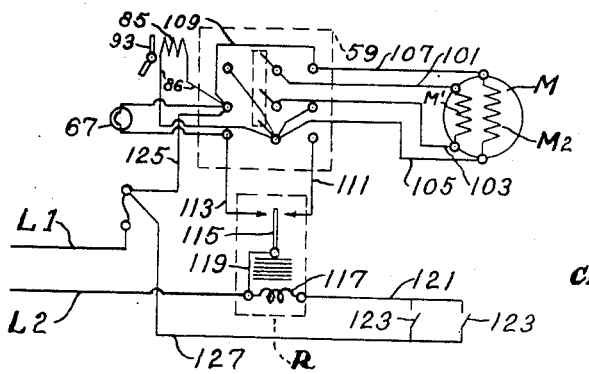
INVENTOR.
CHARLES E. SCHLYTERN
BY
His Attorney Patented July 31, 1951

2,562,823

UNITED STATES PATENT OFFICE 2,562,823

ELECTRICAL POWER-DRIVEN OPERATOR UNIT

Charles E. Schlytern, Detroit, Mich.

Original application March 21, 1947, Serial No. 736,373. Divided and this application September 14, 1948, Serial No. 49,250

3 Claims. (Cl. 172—36)

My invention pertains to electrical motorized power driven means and more especially to an electrical operator unit for moving a member, such as a door for example, back and forth between various positions, at will, and this application is a divisional of my previously filed patent application Serial No. 736,373 filed March 21, 1947 for Power Driven Operating Means.

It is an object of my invention to provide an improved compact electrical operator pack of an electrical motor and controls in a unit which is especially convenient to install and wire.

It is also an object of my invention to provide such an operator unit which is adapted to be mounted cooperatively adjacent the member to be moved back and forth.

Further objects and advantages are within the scope of my invention, such as relate to the arrangement, operation and function of the related elements of the structure, to various details of the construction and to combinations of parts, elements per se, and to economies of manufacture and numerous other features as will be apparent from a consideration of the specification in conjunction with the drawings disclosing specific embodiments of the invention, in which:

Fig. 1 is a side elevational view showing the power and control operator unit;

Fig. 2 is an elevational view showing the inner side or garage side of the power unit;

Fig. 3 is a bottom view of the power unit;

Fig. 4 is a plan view of the control supporting bracket;

Fig. 5 is a plan view of the socket plate;

Fig. 6 is a diagram for illustrating the operation of the reversing switch by the down limit stop on the member to be operated;

Fig. 7 is a diagram showing operation of the reversing switch by the up limit stop from the cable;

Fig. 8 is an enlarged fragmentary view showing the lock and the electromagnetically movable lock strike;

Fig. 9 is a cross-sectional view on line 9—9 in Fig. 8; and

Fig. 10 is a wiring diagram schematically representing the electrical circuits and control means for operating the motor, the electric light and a lock strike for the member.

Referring more specifically to Figs. 1 and 2 of the drawings, it will be seen that my operator pack or power unit comprises a conventional geared electric motor M having a housing 41 on one end enclosing a speed reducing worm gear transmission, on which I provide a drive shaft 43 extending to both sides for convenient coupling, as by a loose coupler 44, to the door shaft 21 from either the right-hand or the left-hand side of the door.

On the opposite end of such a motor I install a second housing 45 which is secured by screws 47 to a bracket 49, of a generally U-shaped cross-section, and the upper ends of the side-walls of this bracket are secured to the adjacent end bell of the motor, as by screws 51. This bracket is seen in side elevation in Fig. 2 and edge or end elevation in Fig. 1. Fig. 4 shows a plan view of the bracket, where it is seen that the four outer corners of the side-walls are provided with holes 53 from receiving the motor attachment screws 51, and the lower yoke portion of the bracket is provided with holes 55 for the screws 47. In the center of the lower yoke of this bracket a hole 57 is provided for receiving the mounting bushing to mount a conventional panel type toggle switch 59 held in the bracket by the usual panel nut 60 with the toggle lever and terminal ball 50' projecting externally. Between the lower end or yoke of the bracket 49 and the lower end of the housing 41, a socket plate 61 is preferably provided. This socket plate 61 is seen in plan view in Fig. 5 and the edge may be seen in Figs. 1 and 2, and the dotted outline is shown in Fig. 3. This socket plate 61 and the end of the housing 41 are of course provided with holes 55' corresponding to the holes 55 in the bracket, as well as a central aperture 57' corresponding to the hole 57 for mounting the snap switch therein. Conventional electric sockets 63 are mounted in and through the end wall of the housing 41 in outwardly opening relation for receiving a fuse 65 and an electric incandescent lamp 67 to be connected into the control circuits, in a manner to be subsequently described. The socket plate 61 has suitable apertures 69 for passing the conventional electric sockets therethrough, the end wall of the housing is provided with similar apertures, and openings 71 are cut out of the side walls of the bracket to accommodate the sides of these sockets. Mounted upon one of the side-walls of the bracket 49 is an initiation or sequence relay R. The structure and operations of the switch and the relay will be subsequently described in detail, with reference to the wiring diagram Fig. 10.

A lock 73 is secured and carried on a member to be operated, as for example, on the rear or inner side of a door section panel 15 with its bolt 75 projecting to one side suitably to engage the inclined surface or cam 77 on a lock strike 79. This arrangement is such that, as the door or other member descends, the lock bolt 75 is depressed by the inclined cam surface 77 of the lock strike and then the lock bolt snaps out under the lock strike, as shown in Figs. 8 and 9, to hold the door locked down in a closed position. A key hole 79' (shown dotted) is provided through the door panel 15 and also the block 81 whereon the lock is mounted so that it can be conveniently controlled by an authorized person on the outside, and of course it may be controlled from the inside by the conventional knob 83. The lock 73 may be any conventional cylinder and latch type of lock.

So that the door or other member may be automatically unlocked when the electric motor is energized to open the door, I support the lock strike 79 movably for control by a solenoid or electromagnet 85, which is connected by wires 86 to be energized when the motor is energized, as will be subsequently described. For this purpose, the lock strike 79 may be pivotally mounted on a pivot pin 87 which is supported in a stationary plate 89 secured to the wall or door casing, as by screws 91. The relation of the movable and the stationary parts of the lock strike are much like the two parts of a door hinge, except that a portion of the stationary plate 89 is bent away from the building structure to extend alongside the guide track 17, and the movable part 79 of the lock strike is bent to curve around the guide rail 17, as may be seen in Figs. 8 and 9, with a portion 93 projecting to the other side of the pivot pin to be attracted as an armature by the electromagnet 85, to swing the cam and lock strike surface 79 back to the unlocked position, shown by dotted lines in Fig. 9. A spring 95 is provided curled around the mid-portion of the pivot pin 87. One end of this spring reacts against the stationary part of the lock strike so that the other end of the spring normally biases the movable part of the lock strike to the locking position, shown in full lines in Fig. 9.

Fig. 10 diagrammatically represents the connection of the electric motor M into a system with the service lines for energization and operation through the control devices previously described. The reversing switch 59 is a conventional 3-pole double throw switch having three blades tied together to move either to the right-hand side to operatively engage a corresponding set of three stationary contacts or to the left-hand side to engage another set of three stationary contacts. From the upper and the middle blades of the reversing switch 59, wires 101 and 103 respectively extend to the terminals of one of the windings M1 of the motor. The bottom blade of the reversing switch 59 is connected by a wire 105 to one terminal of the other winding M2, of the motor, and the other terminal of this winding is connected by a wire 107 to the upper right-hand stationary contact, and from whence a wire 109 connects to the center left-hand contact of this switch. From the bottom blade of the reversing switch, a wire connects to the upper left-hand and also to the central right-hand contacts, although this may be all accomplished by means of the single wire 105 extending from this blade to the motor. From the lower right-hand contact of the reversing switch a wire 111 connects to the right-hand stationary contact of the initiating relay R and a wire 113 connects from the left-hand stationary contact of this relay to the left-hand lower contact of the reversing switch.

The initiating or sequence relay R has a single movable blade 115 which is moved to engage first one and then the other one of its two stationary contacts by the successive energization or pulsing of a winding 117 in a manner common with such relays, as by means of the well known pawl and ratchet arrangement (not shown). This movable blade 115 is connected by a wire 119 to one end of the coil 117, where also is connected one end of the service line L2. From the other terminal of the relay winding 117 a wire 121 connects the one side of a convenient push button 123 or any other suitable actuating means. The other line conductor L1 connects to one end of the fuse 65 (by connection to one side of the fuse socket) from the other end of which a wire 125 connects to the center left-hand stationary contact of the reversing switch 59. From the other end of fuse 65 and wire 125, a wire 127 connects to the other side of the push button 123. The lamp 67 is connected across the bottom and the center left-hand contacts of the reversing switch 59, and the connection of the motor windings into the system is so selected that when this reversing switch is in its left-hand position, the direction of operation is to open the door. The lock release electromagnet 85 is connected by wires 86 to the lower movable blade and to the left-hand center contact of the reversing switch. Hence the lamp 67 is lighted and the lock is released when the system is energized to "open" the door.

In operation: By operating the push button 123 a circuit is completed which energizes the winding 117 of the sequence relay R. This causes the relay R to throw its blade 115 to its opposite or alternate position in a well known manner. This completes the motor energizing circuits, the two windings M1 and M2 being energized to run the motor in a direction as predetermined by the set position of the reversing switch 59. As the controlled member or door 15 approaches its extreme position the reversing switch 59 is thrown over thus interrupting the operation and setting the motor circuits for reverse operation the next time the relay R is operated by the push button 123.

This throw over of the reversing switch is accomplished by means of a lever 129 which is pivotally supported on one of the screws 47 on the bottom of the power unit. The inner end of this lever 129 is apertured and bent down suitably to receive the ball 50' on the lower end of the toggle lever of the reversing switch. The other end of this lever carries a roller 131 projected suitably from the power unit to be adjacent the door which carries a bracket 133 having an inclined cam 135 which strikes the roller and moves it outwardly toward the door. For clearness this operation is diagrammatically represented in Fig. 6. For the up limit operation, an up limit lever 137 is pivotally mounted on a stationary bracket 139 below the power unit and it extends up along the track 19 to the door side of the switch lever, which it engages by a projection 140. The upper end of this up limit lever 137 is bent and provided with a roller 141 which is suitably positioned to be pulled inwardly away from the door by the cable 31 as the door reaches its uppermost position. This operation is diagrammatically shown in Fig. 7.

In view of the power unit having controls compactly assembled it may be very conveniently installed and wired, as it can be pre-wired in the factory leaving only the local connections to be completed. The service conductors L1 and L2 may be the conductors of a plug-in cord so that it is only necessary to plug in the energizing connection after the power unit has been mounted in proper relation to its limit controls. Usually it will be preferred to mount the push button 123, or other actuating means, separately from the unit, as for example on the wall of the garage if it is to be used for operating a garage door. Also a plurality of the actuating push buttons 123 may be provided and connected in parallel if desired, as represented in Fig. 10. Although application of the operator to a particular type of door operating installation has been represented, by way of example, it will be understood that it may be readily arranged to work in cooperation with travelling cable pulling carriages or other door operating systems, or even to move other members than doors, by disposing the limit and reversing switch suitably for operation by such an actuated member as it moves back and forth.

It is apparent that within the scope of my invention modifications and different arrangements may be made other than herein disclosed, and the present disclosure is illustrative merely, the invention comprehending variations thereof.

What is claimed as the invention is:

1. A compact member engageable operator unit for operating a member back and forth comprising, mounting means, a reversible electric motor mounted thereon and having speed reducing gears enclosed in a housing at one end of the motor, a second housing extending from the other end of the motor, a reversing switch mounted in said second housing, and switch actuating means extending from said reversing switch and exposed externally from the second housing so that by installation of the operator unit in a suitable operative relation to a member to be moved back and forth between two extreme positions said actuating means may be moved by direct engagement with said member to throw the reversing switch back and forth.

2. A compact member engageable operator unit in accordance with claim 1, and further characterized by having a sequence relay in said second housing for responding to an external control, said sequence relay being connected with said switch to complete motor energizing circuits prepared by said reversing switch.

3. A compact member engageable operator unit for operating a member back and forth comprising, mounting means, a reversible electric motor mounted thereon, said motor having speed reducing gears enclosed in a housing at one end of the motor, oppositely directed power take-off connections, a second housing supported on the other end of the motor, a reversing switch mounted in said second housing, and switch actuating means extending from said reversing switch and projecting externally from the second housing so that by installation of the operator unit in a suitable operative relation to the path of a member to be moved back and forth between two extreme positions said actuating means may be operated by direct engagement with said member to throw the reversing switch back and forth.

CHARLES E. SCHLYTERN.

REFERENCES CITED

The following references are of record in the file of this patent:

UNITED STATES PATENTS

| Number | Name | Date |
| --- | --- | --- |
| 1,768,564 | Campbell et al. | July 1, 1930 |
| 1,799,348 | Apple | Apr. 7, 1931 |
| 1,854,584 | Gorman | Apr. 19, 1932 |
| 2,430,729 | Negri | Nov. 11, 1947 |
| 2,454,832 | Paulus | Nov. 30, 1948 |